2,944,932

INSECT COMBATTING AGENT

Roy E. Stansbury and Rector P. Louthan, Bartlesville, Okla., assignors to Phillips Petroleum Company, a corporation of Delaware No Drawing. Filed May 8, 1958, Ser. No. 733,834

14 Claims. (Cl. 167—22)

This invention relates to the combatting of insects. In one of its aspects, the invention relates to an insect combatting agent. In another of its aspects, the invention relates to a method of combatting an insect. In a more specific aspect of the invention, it relates to a method and composition applicable for combatting insects, especially to repel the same, the said method and composition being based upon the combatting effectiveness of a compound having the structural characteristics as follows:

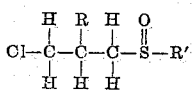

wherein R is selected from the group consisting of H and $CH_3$ and R' is selected from the group consisting of normal, secondary, and tertiary-octyl groups.

Insecticidal, as well as insect repellent mixtures, are now known and used to control insects, such as flies, mosquitoes, roaches, etc. The field of insect combatting agents is divided broadly into two classifications, agricultural agents and household agents. While the usual primary purpose of an insect combatting agent of both of the classified types is to kill the insect, it is highly desirable particularly in some applications, especially those which are related to the household or to human or agricultural animals, to have an agent which will combat the insect primarily by effectively repelling the insect from the area or animal desired to be protected. For example, the housewife is particularly interested to obtain an insect combatting agent which will prevent the insect from infesting a given area. Also, with respect to attack of human or agricultural animals, the primary purpose to be achieved is to prevent the insect from attacking the animal. In many other applications, a combatting agent which will repel an insect is considerably more desirable than an agent which is toxic and which leads to knockdown or kill of the insect in the area to be protected. Thus, for example, when setting up a picnic table, a repellent which will prevent flies from alighting on the table and on food is obviously more desirable than a material which will either knock down or kill the fly or other insect causing it to infest the area to be protected. Clearly, contamination of food and the unsightly presence of dead or paralyzed insects is to be avoided where possible.

We have now found that certain sulfoxides having the structural characteristics as above set forth are effective repellents for insects, especially for house and stable flies (*Musca domestica* and *Stomoxys calcitrans*).

Compounds which are of particular interest are as follows:

3-chloropropyl n-octyl sulfoxide
3-chloropropyl sec-octyl sulfoxide
3-chloropropyl tert-octyl sulfoxide
2-methyl-3-chloropropyl n-octyl sulfoxide
2-methyl-3-chloropropyl sec-octyl sulfoxide
2-methyl-3-chloropropyl tert-octyl sulfoxide The sulfoxides named in this invention can be prepared by oxidizing the corresponding 3-chloropropyl octyl sulfide to the sulfoxide by means of hydrogen peroxide or an organic peracid such as peracetic acid. The sulfides can be prepared by reacting allyl chloride with the desired octyl mercaptan (normal, secondary or tertiary) in the presence of ultraviolet light.

It is an object of this invention to provide insect combatting agents. Another object is to provide a method of combatting an insect, especially to repel the same. It is a further object of this invention to provide an insect combatting composition. It is a still further object of this invention to provide certain agents for use in insect combatting compositions, especially compositions useful for repelling insects.

Other aspects, objects and the several advantages of the invention are apparent from a study of this disclosure and the appended claims.

According to the invention, there is provided a method of combatting an insect which comprises subjecting said insect to an effective quantity of at least one compound having the structural characteristics above set forth.

Although the invention will now be described with respect to repelling of insects, it will be understood by those skilled in the art that a general insect combatting formulation can contain both an insecticide, as well as an insect repellent, and that, therefore, the agents of the invention can be used either alone or in admixture with other insect combatting agents be these repellents or insecticides or both.

The agents of the present invention are possessed of extremely good repelling activity which is, indeed, surprising in view of the ineffectiveness of closely related compounds as indicated in Table I hereof.

Furthermore, the agents of the present invention have many desirable attributes for use in various insect combatting compositions. Not only are these agents highly effective as fly repellents effective against both house and stable flies but they are substantially non-toxic toward mammals in amounts normally encountered. They have excellent stability toward heat and light, even under humid conditions. They are soluble in high concentrations in many common solvents. Since they are compatible with many other commonly employed insecticidal or insect repellent compositions, they can be composited therewith. The agents of the present invention can be applied in a conventional manner to obtain good results. Thus, solutions, emulsions, dusts, wettable powders, and aerosols comprising the agents of the invention can be used.

The insect combatting agents of this invention are effective when employed in very small amounts. Thus, when applied in the usual manners over an area or volume, as little as about 0.05 percent by weight of the overall composition is found to be effective. However, even lower amounts or concentrations can be used and when applied for repelling purposes there is virtually no upper limit except that dictated by economy and esthetic considerations.

Solvents which are suitable for the application of the repellents of the invention include naphtha, kerosene, and particularly so-called deodorized kerosene, toluene, xylene, cyclohexanone, acetone, etc.

A particularly effective and now preferred composition is obtained employing a substantially odor-free Soltrol (a trademark) which is an isoparaffinic hydrocarbon solvent fraction boiling in the approximate range of 260–800° F. and which preferably has been prepared by hydrofluoric acid alkylation of an isoparaffin with an olefin under alkylation conditions known in the alkylation art as exemplified in U.S. Patent 2,773,920, issued December 11, 1956, in the names of L. H. Vautrain and E. Strunk.

The solutions prepared with the foregoing solvents and related liquids can be conveniently dispensed as space sprays using aerosol type bombs pressurized with a suitable propellant such as butane as known and practiced in the art.

The agents of the present invention also possess the property of synergism with certain other compounds. Although this synergism is not included within the scope of the appended claims, it is mentioned here as one of the highly advantageous properties of the agents of the invention. This synergism is further described and is claimed in another application.

When applying the agents of the invention to a surface area to repel insects, such as flies, therefrom, the method of application is adjusted as will be understood by one skilled in the art in possession of this disclosure to deposit approximately 0.1 to 20 grams per 100 square feet. Application by spraying as with aerosol bombs to a space will be adjusted to suspend approximately 0.001 to 5 grams per 100 cubic feet.

The agents of the invention are effective whenever an appreciable quantity of any one or more of them is present at the place from which the insect is to be repelled.

The following examples are pertinent to this disclosure and to the claims.

EXAMPLE I.—SANDWICH BAIT TEST

This test involves placement of a porous barrier treated with the candidate insecticide between the starved insects (house flies) and food. If the chemical is repellent, the flies will not eat. If the chemical is not repellent, the insects will eat the food through the barrier.

The bait is prepared as follows: A smooth thin film of unsulfured molasses is spread on a 1″ x 4″ strip of cardboard leaving a margin of at least ¼ inch on all sides. The purpose of the margin is to prevent the feeding of the insects unless they are actually on the strip, thus facilitating counting. These prepared strips are dried in the oven at 45° C.

Porous cover strips of lens paper are impregnated with the chemical under examination and superimposed on the bait. The paper is thin, porous, and highly absorbent. The loose fiber construction of this paper permits the fly to remove the molasses through it. In order to impregnate these strips uniformly, they are immersed in an acetone solution of the material to be tested. They are then hung over a glass rod and dried for 6 hours.

Just before the test is begun, the dried cover strips are carefully placed over the baits and fastened in place by stapling. In assembling the bait, care is taken not to press down on the bait or touch it with the fingers as the molasses is easily forced up through the cover strip. Two sandwich baits are attached to a cardboard backing. The whole assembly then is taped onto one of the jar lids that fit the opening in the rubber back of the insect cages.

The lid with the baits is fitted into an aperture in a cage so that the baits are exposed to attack. Flies over five days old which have been starved for six hours are used. Counts of the number of flies feeding on the strips are taken after five and fifteen minutes and every fifteen minutes thereafter for two and a half hours. In some cases where the chemical is not repellent, the flies eat all the molasses before the two and one half hours are up. In this case, counts are discontinued. The non-repellents become black with flies soon after being placed in the cages. The good repellents are untouched. The difference is very striking.

Table I summarizes the results of sandwich bait tests. Tests 1, 2, 3 and 4 wherein 1 percent acetone solutions were used as well as tests 5 and 6 wherein 0.5 percent solutions were applied show the effectiveness of the compounds having as one substituent the 3-chloropropyl or the 2-methyl-3-chloropropyl group and as the second substituent a normal, secondary or tertiary octyl group. Related compounds, such as those applied in tests 7–18 were ineffective at comparable dosages.

EXAMPLE II.—LIGHT STABILITY OR EXPOSURE TEST

This test involves exposure of the insecticide in a humid atmosphere to an ultraviolet lamp (General Electric Sunlight S–1). The lamp was suspended in a shade above a phonograph turntable (33 r.p.m.) on which was mounted an aluminum dishpan. Two large cellulose sponges were placed in the dishpan and covered with 4 mesh hardware cloth. The sponges were kept wet by excess water in the pan. Clean filter paper was placed on the hardware cloth and the strips of repellent impregnated lens paper were pinned in place. The distance from the test strips to the light, nine inches, was adjusted to maintain a temperature of about 100° F. The decomposition was determined by the sandwich-bait method against house flies. The chemicals were deposited on strips of lens paper by dipping in acetone solutions. All the amounts of chemicals are recorded as the concentration of the dipping solution. The strips were dipped and dried overnight. An exposure of four hours to the light was made the next morning and the repellency was determined in the afternoon.

A test comparable to test 1 of Table I was performed after exposure of the test specimen to ultraviolet light as described. The results obtained were the same as with the unexposed specimen. These tests indicate that exposure to sunlight even under humid, hot conditions will not impair the effectiveness.

EXAMPLE III.—TOXICITY TEST

Two chicks (about 3 days old) were fed with a commercial feed admixed with 0.5 weight percent 3-chloropropyl n-octyl sulfoxide. The feed consumed and the weight gain of the chicks was determined and compared with chicks fed with the same commercial feed but without added sulfoxide. As shown in Table II the chicks fed the sulfoxide-containing food consumed more food but at slightly less efficiency. The weight gain was about the same—849 vs. 850—for both sets of chicks. There was no indication of any harmful effect of the sulfoxide in the feed.

EXAMPLE IV.—OLFACTOMETER TEST

The olfactometer is an instrument that supplies two streams of air to a cage. One stream passes through a filter on which some of the candidate repellent has been placed. The other stream is not treated and serves as a control. To conduct an olfactometer test a 0.1 gram sample of the repellent is dissolved in acetone and the solution is used to saturate a filter pad (American Optical Company R–7 filter pad of the type used in respirators). The pad is air dried and fixed over a metal tube. A glass cylinder is then fixed over the pad. This cylinder (about 4″ I.D. and 6″ long), in turn, is placed in contact with the wire surface of the insect cage. Similarly, an untreated pad is set up as a control.

Air is blown at the same volume rate through both pads. The number of house flies on the screen wire within the area outlined by the glass cylinder is counted after 5, 10 and 15 minutes and at 15 minute intervals thereafter until ten readings have been made. The average of these ten readings is used to determine the percent increase or decrease in number of flies on the treated circles.

The results of olfactometer tests showed that no flies alighted on the wire when the air was filtered through a pad treated with 3-chloropropyl n-octyl sulfoxide. The control test gave an average of 16.2 flies. The sulfoxide was completely effective in repelling flies by this test.

Table I.—Sandwich bait test with house flies using various sulfoxides

PART A.—SULFOXIDES USED AS 1% ACETONE SOLUTIONS

| Test No. | Sulfoxide | Number of flies feeding at indicated time (minutes) | | | | | | | | | | | | Bait left, Percent [c] After Overnight Exposure |
|---|---|---|---|---|---|---|---|---|---|---|---|---|---|---|
| | | 5 | 15 | 30 | 45 | 60 | 75 | 90 | 105 | 120 | 135 | 150 | 165 | |
| 1 | 3-chloropropyl n-octyl | 0 | 0 | 0 | 0 | 0 | 0 | 0 | 0 | 0 | 0 | 0 | 0 | 100 |
| 2 | 3-chloropropyl sec-octyl | 0 | 0 | 1 | 0 | 0 | 0 | 0 | 0 | 0 | 0 | 0 | 0 | |
| 3 | 2-methyl-3-chloropropyl n-octyl | 0 | 0 | 1 | 1 | 1 | 1 | 0 | 0 | 1 | 0 | 1 | 4 | [a] 94 |
| 4 | 3-chloropropyl tert-octyl | 0 | 0 | 0 | 0 | 0 | 0 | 0 | 0 | 0 | 4 | 1 | 4 | [a] 98 |

PART B.—SULFOXIDES USED AS 0.5% ACETONE SOLUTIONS

| 5 | 3-chloropropyl n-octyl | 0 | 0 | 0 | 0 | 0 | 0 | 0 | 0 | 0 | 0 | 0 | 0 | 100 |
|---|---|---|---|---|---|---|---|---|---|---|---|---|---|---|
| 6 | 2-methyl-3-chloropropyl n-octyl | 0 | 0 | 0 | 1 | 0 | 0 | 0 | 0 | 0 | 1 | 1 | 4 | |

PART C.—SULFOXIDES USED AS 1% ACETONE SOLUTIONS

| 7 | 3-chloropropyl n-amyl | 0 | 4 | 12 | 32 | 3 | 2 | 8 | [b] | | | | | |
|---|---|---|---|---|---|---|---|---|---|---|---|---|---|---|
| 8 | 3-hydroxypropyl n-octyl | 50 | 50 | 28 | 12 | 3 | 6 | 8 | [b] | | | | | |
| 9 | 3-chloropropyl n-butyl | 19 | 42 | 28 | [b] | | | | | | | | | |
| 10 | 3-chloropropyl tert-butyl | 2 | 50 | 25 | 12 | [b] | | | | | | | | |
| 11 | 3-chloropropyl isobutyl | 10 | 50 | 22 | [b] | | | | | | | | | |
| 12 | 3-chloropropyl 2-ethylhexyl | 0 | 12 | 15 | 6 | [b] | | | | | | | | |
| 13 | 3-chloropropyl 2,4,4-trimethyl-1-pentyl | 3 | 15 | 22 | 8 | [b] | | | | | | | | |
| 14 | 3-chloropropyl tert-dodecyl | 0 | 0 | 0 | 5 | 13 | 18 | 18 | 12 | [b] | | | | |
| 15 | 3-chloropropyl dicyclopentadienenyl | 0 | 0 | 0 | 14 | 8 | 1 | [b] | | | | | | |

PART D.—ALKYL SULFOXIDES USED AS 1% ACETONE SOLUTIONS

| 16 | di-n-butyl | 0 | 0 | 4 | 20 | [b] | | | | | | | | |
|---|---|---|---|---|---|---|---|---|---|---|---|---|---|---|
| 17 | n-octyl n-propyl | 3 | 3 | 3 | 3 | 0 | 0 | 0 | | 1 | | 1 | 6 | |
| 18 | tert-octyl methyl | 15 | 28 | 30 | 25 | [b] | | | | | | | | |

[a] Observation after starving flies 165 minutes.
[b] Food is gone at the indicated time and hence the test is terminated.
[c] After exposure overnight to starving flies.

Table II.—Toxicity test using two chicks fed 28 days with commercial feed containing 0.5% of 3-chloropropyl n-octyl sulfoxide

| Repellent | Feed Consumed, g. | Final Weight, g. | Weight Gain, g. | Efficiency,[1] Percent |
|---|---|---|---|---|
| None | 1,664 | 970 | 849 | 51 |
| 3-chloropropyl n-octyl sulfoxide | 1,807 | 984 | 850 | 46 |

[1] Efficiency is percentage of food consumed which resulted in increase in weight.

Reasonable variation and modification are possible within the scope of the foregoing disclosure and the appended claims to the invention, the essence of which is that 3-chloropropyl octyl and 2-methyl-3-chloropropyl octyl sulfoxides, as set forth and described, have been found to possess effectiveness as insect combatting agents, particularly for repelling insects, especially house flies and stable flies.

We claim:
1. A method for combatting an insect which comprises subjecting said insect to the action of an effective amount of at least one compound selected from the group of compounds having the structural characteristics as follows:

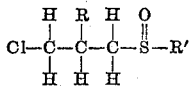

wherein R is selected from the group consisting of H and CH₃ and R' is seelcted from the group consisting of normal, secondary, and tertiary-octyl groups.

2. A method of repelling an insect which comprises subjecting said insect to the repelling action of 3-chloropropyl n-octyl sulfoxide.

3. A method of repelling an insect which comprises subjecting said insect to the repelling action of 3-chloropropyl tert-octyl sulfoxide.

4. A method of repelling an insect which comprises subjecting said insect to the repelling action of 3-chloropropyl sec-octyl sulfoxide.

5. A method of repelling an insect which comprises subjecting said insect to the repelling action of 2-methyl-3-chloropropyl n-octyl sulfoxide.

6. A method of repelling an insect which comprises subjecting said insect to the repelling action of 2-methyl-3-chloropropyl sec-octyl sulfoxide.

7. A method of repelling an insect which comprises subjecting said insect to the repelling action of 2-methyl-3-chloropropyl tert-octyl sulfoxide.

8. An insect combatting composition comprising a compound selected from the group of compounds having the structural characteristics as follows:

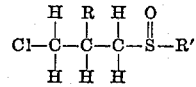

wherein R is selected from the group consisting of H and CH₃ and R' is selected from the group consisting of normal, secondary, and tertiary-octyl groups dispersed in an insect-combatting adjuvant carrier.

9. An insect-combatting composition comprising 3-chloropropyl n-octyl sulfoxide dispersed in an insect-combatting adjuvant carrier.

10. An insect-combatting composition comprising 3-chloropropyl tert-octyl sulfoxide dispersed in an insect-combatting adjuvant carrier.

11. An insect-combatting composition comprising 3-chloropropyl sec-octyl sulfoxide dispersed in an insect-combatting adjuvant carrier.

12. An insect-combatting composition comprising 2-methyl-3-chloropropyl n-octyl sulfoxide dispersed in an insect-combatting adjuvant carrier.

13. An insect-combatting composition comprising 2-methyl-3-chloropropyl sec-octyl sulfoxide dispersed in an insect-combatting adjuvant carrier.

14. An insect-combatting composition comprising 2-methyl-3-chloropropyl tert-octyl sulfoxide dispersed in an insect-combatting adjuvant carrier.

References Cited in the file of this patent

Roark: A list of Organic Sulphur Compounds Used as Insecticides, May 1935, p. 34.

Frear: A Catalogue of Insecticides and Fungicides, Chronica Botanica Comp., 1947, vol. 1, p. 58.